(12) United States Patent
Russon

(10) Patent No.: US 7,028,058 B2
(45) Date of Patent: Apr. 11, 2006

(54) SYSTEM AND METHOD FOR PRESERVING METADATA IN AN ELECTRONIC IMAGE FILE

(75) Inventor: Virgil Kay Russon, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 387 days.

(21) Appl. No.: 10/155,205

(22) Filed: May 23, 2002

(65) Prior Publication Data
US 2003/0220894 A1    Nov. 27, 2003

(51) Int. Cl.
*G06F 17/30* (2006.01)

(52) U.S. Cl. ............... 707/204; 707/3; 707/10; 707/104.1; 707/203; 707/205

(58) Field of Classification Search .......... 707/3, 707/10, 104.1, 200–205; 382/305, 306; 711/162
See application file for complete search history.

(56) References Cited

U.S. PATENT DOCUMENTS

| 5,870,762 | A | 2/1999 | Lee |
| 5,943,688 | A | 8/1999 | Fisher |
| 6,018,744 | A | 1/2000 | Mamiya |
| 6,243,502 | B1* | 6/2001 | Christensen et al. ........ 382/305 |
| 6,480,944 | B1* | 11/2002 | Bradshaw et al. .......... 711/162 |
| 6,571,245 | B1* | 5/2003 | Huang et al. ................. 707/10 |
| 6,625,623 | B1* | 9/2003 | Midgley et al. ............ 707/204 |

FOREIGN PATENT DOCUMENTS

EP    0336548 A2    2/1989

* cited by examiner

*Primary Examiner*—Cam-Y Truong

(57) ABSTRACT

A method of preserving metadata in an electronic image file includes copying metadata into the image file from a metadata backup database after the metadata are removed from the electronic image file. An image file management application comprised of computer-readable instructions stored on a computer-readable medium, causes a computer or processor to access an electronic image file and copy metadata into the image file from a metadata backup database after the metadata are removed from the electronic image file.

15 Claims, 7 Drawing Sheets

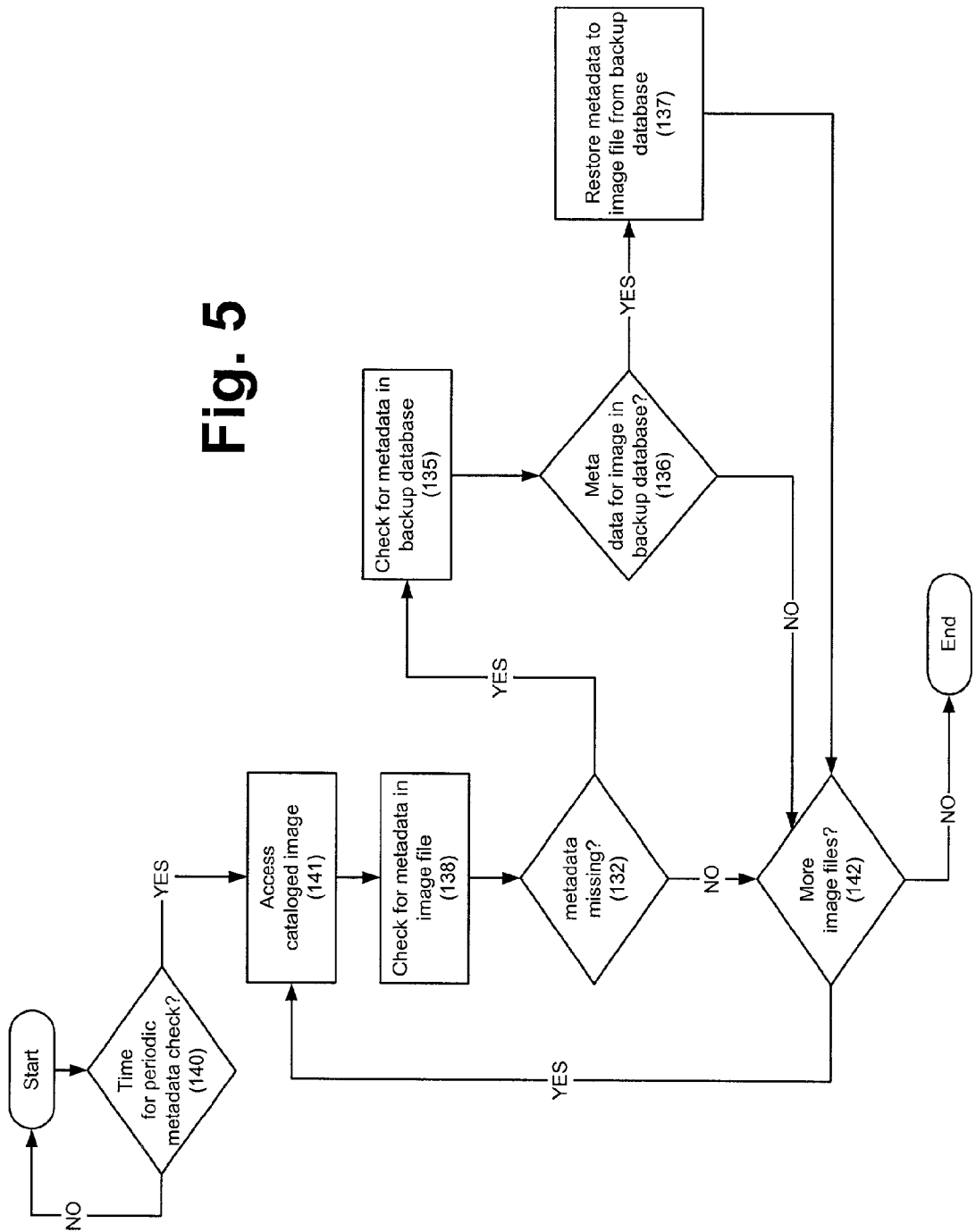

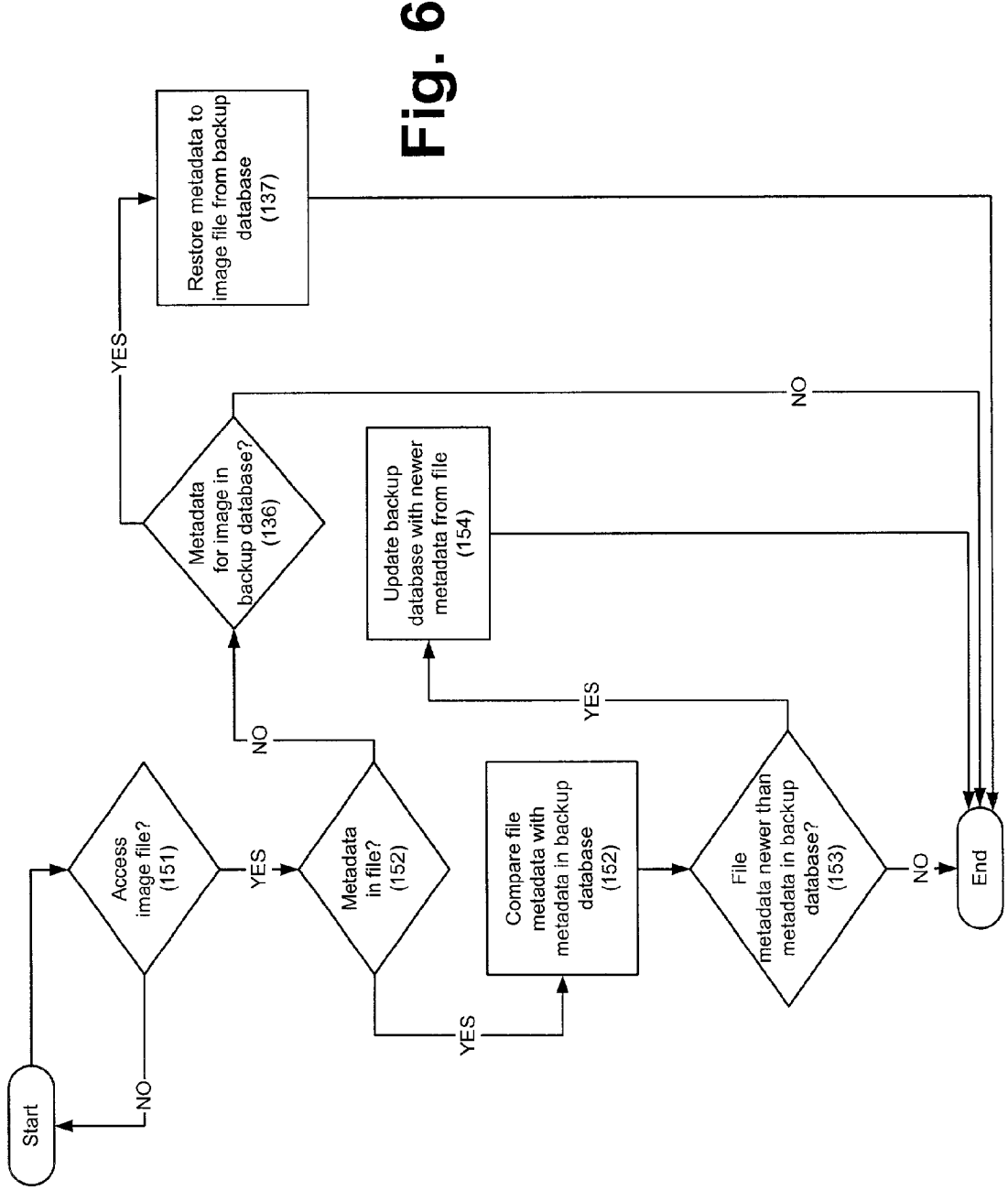

SYSTEM AND METHOD FOR PRESERVING METADATA IN AN ELECTRONIC IMAGE FILE

FIELD OF THE INVENTION

The present invention relates to digital imaging. More particularly, the present invention relates to the field of preserving metadata within electronic image files.

BACKGROUND OF THE INVENTION

Metadata literally means data about data. In other words, metadata are information associated with a piece of data that describes or characterizes the associated piece of data. For example, in a database, one data item may be a phone number, another a name and another an address. The address may have metadata associated with it that indicates: "this is an address" or "this address came from the current phone book," or "this address was entered by John". Consequently, metadata can be used to sort or organize the database in many different ways. Metadata can also simply provide additional information about the source or other aspects of the data that may be important to a user. For example, metadata may specify the type of data, one or more relevant categories the data belongs to, the source of the data, who input the data, when the data was input, etc.

If the metadata are, for any reason, removed, the data itself is not changed in any way and can still be used to the extent the application using the data does not rely on associated metadata. Extending the example above, if an address is associated with metadata indicating that the address was taken from the current phone book, a user can readily obtain a list of all addresses in the database that came from the current phone book. If the metadata are removed, the user can still use the address data as an address, but will probably not be able to readily determine the source of the address data.

Metadata are commonly used in a wide variety of applications. For example, meta-tags are a specific form of metadata. Meta-tags are associated with web pages on the Internet and usually include key words that describe the content of the associated web page. Meta-tags are then used by search engines to classify web-pages and identify pages of potential interest in response to a user's search. Metadata are also commonly used in organizing electronic files on a computer system. Metadata associated with each file may identify when and by whom the file was created, the size or type of the file, and other information.

In particular, metadata can be used with electronic image files. For both business and personal applications, people now create large amounts of digital images every day. Frequently those images are shared by transmission over the Internet. Because of this increasing use of digital images, problems arise in the effective use, categorization, cataloging and sharing of these images. Consequently, metadata are often generated and included in the image file. Currently, almost all digital cameras generate a standardized set of metadata according to a standard known as Exchange Image File Format (EXIF). The EXIF standard was created by the Japan Electronic Industrial Development Associate (JEIDA), a Japanese consortium of companies that make digital imaging products. An EXIF standard was released in October 1995 and revised in November 1997. Under the EXIF standard, as the image file is created, for example as a ".jpg" or ".tif" file, an EXIF header is appended to the file containing metadata about the image. This metadata may include such items as when the image was created, the equipment and settings used, etc.

Additionally, the Digital Imaging Group (DIG) has created new specifications, known as the DIG35 Metadata Specification, that transform images into self-contained information modules. The Digital Imaging Group (DIG) is a consortium of many industry leaders in graphics, imaging and software. DIG35 member companies collaborated to create a specific set of metadata for describing elements of an image. The DIG35 Metadata Specification provides a comprehensive set of metadata definitions that will supply standard classification of objects.

Using metadata, information can be added to digital image files to supplement the pixel or image data itself. Information can be added about subject matter, how and where the image was created, by whom, what usage is appropriate, categorization and more. Photographers are able to log information about camera settings, copyright information or image manipulation techniques within the image itself.

The practical uses of metadata in electronic image files are abundant. For example, a user can search for an image based on subject matter using keywords encoded in the image file as metadata. For image sharing, metadata can be used to caption or tell the story behind the images.

Given the importance or potential importance of metadata in image files, it becomes important to safeguard and maintain that metadata within the corresponding image file.

SUMMARY OF THE INVENTION

One embodiment of the present invention provides, among other things, a method of preserving metadata in an electronic image file, the method comprising copying metadata into the image file from a metadata backup database after the metadata are removed from the electronic image file.

Another embodiment of the present invention also provides an image file management application comprised of computer-readable instructions stored on a computer-readable medium, the instructions causing a computer or processor to access an electronic image file and copy metadata into the image file from a metadata backup database after the metadata are removed from the electronic image file.

A further embodiment of the present invention also provides a system for preserving metadata in an electronic image file, the system comprising a computer running an image file management application, a library of electronic image files and a backup database with a copy of metadata from the electronic image files in the library, wherein the image file management application copies metadata from the backup database into a corresponding image file when the metadata are removed from the image file.

BRIEF DESCRIPTION OF THE DRAWINGS

The accompanying drawings illustrate embodiments of the present invention and are a part of the specification. Together with the following description, the drawings demonstrate and explain the principles of the present invention. The illustrated embodiment are examples of the present invention and do not limit the scope of the invention.

FIG. 5 is a flowchart illustrating another preferred method of preserving image file metadata according to the present invention.

FIG. 6 is a flowchart illustrating a further preferred method of preserving image file metadata according to the present invention.

Throughout the drawings, identical reference numbers designate similar, but not necessarily identical elements.

DETAILED DESCRIPTION OF THE PREFERRED EMBODIMENTS

When electronic image files are manipulated with an image editor, i.e., software for editing or viewing electronic images, the image editor frequently strips away and discards any metadata that is recorded in the image file. The user is typically unaware that the metadata has been lost.

Under the principles of the present invention a backup database of the metadata for a library of electronic image files is maintained. Periodically, or upon file access, the image management system will check the image file for metadata. If none is detected, the image management system will attempt to retrieve the metadata for the file from the backup database and restore a copy of that data to the image file. In this way, the metadata in each image file is preserved and becomes more stable. Consequently, the metadata can be more reliably used in a variety of applications, even if the image file is shared or transferred among many users.

Figure 1:
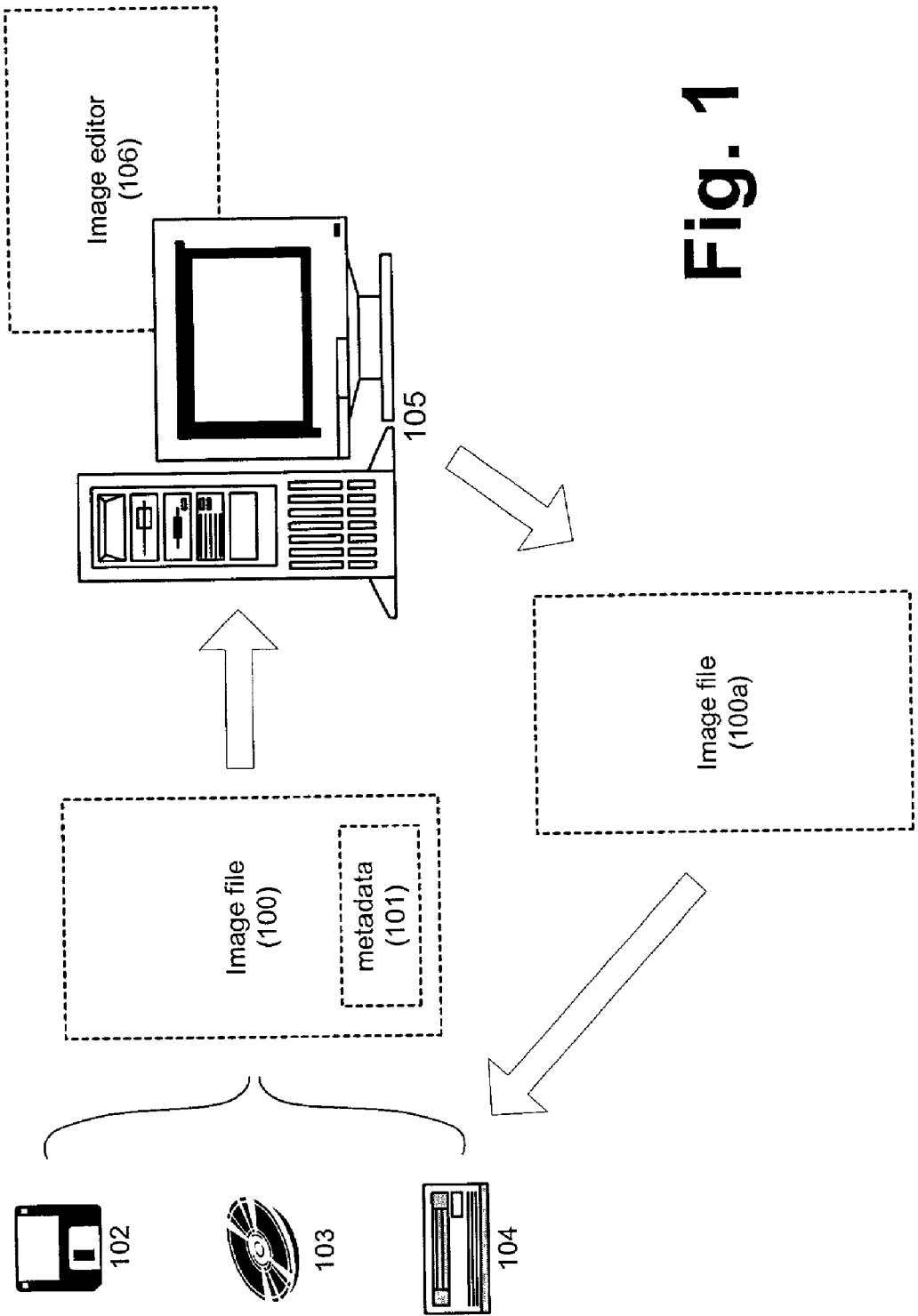
FIG. 1 is an illustration of an embodiment of a computer system used to edit image files bearing metadata with which the present invention can be practiced.

FIG. 1 is an illustration of an embodiment of a computer system used to edit image files that contain metadata with which the present invention can be practiced. As shown in FIG. 1, a library of image files may be maintained on a variety of storage media, including, but not limited to, a floppy disk (102), an optical disc (103) (e.g., a CD or CD-ROM) or a hard drive (104).

When a user wishes to edit an image file (100), a computer system (105) running an image editor (106) is employed. There are many examples of commercially available image editors, including Adobe PHOTOSHOP and Microsoft PICTURE IT PUBLISHING. Additionally, some word processors and similar applications have some image manipulation capabilities and could be considered image editors under the principles of the present invention.

The user retrieves the image file (100) from wherever it is stored, e.g., the floppy disk (102), optical disc (103) or hard drive (104). The retrieved image file (100) may include metadata (101) that, in some way, describes something about the image file (100). As noted above, the metadata (101) may be used to specify the content of the image, the date or time the image was created and by whom, what equipment and settings were used to create the image file, captions for the image, etc.

Once retrieved, the image file (100) can be edited or manipulated using the image editor (106) running on the computer (105). Typically, the user controls the image editor (106) through a mouse, keyboard or other user input devices of the computer (105). The image editor (106) can be used to, for example, to rotate or crop the image; adjust the brightness, tint and colors of the image; alter the shape of objects in the image; add lines to the image; repair distortions in the image, etc.

As noted, image editors (106) tend to remove and discard the metadata (101) when performing any editing of the image file (100). For example, an operation as simple as rotating the image 90 degrees can cause the image editor (106) to remove the metadata (101) from the image file (100). If, after editing, the edited image file (100a) is saved over the original image file (100), the metadata (101) previously stored in the image file will be completely lost.

More specifically, after a user has edited the image file (100), the user will likely save the edited file (100a). Unless otherwise specified by the user, the edited file (100a) will typically retain the same name and replace the original file (100) on the storage medium (e.g., 102, 103 or 104) where the original file (100) was stored. Thus, the original file (100) and the metadata (101) it contained will likely be overwritten and will no longer be accessible. Moreover, even if the edited image file (100a) is saved under another name and does not impede access to the original file (100), anyone accessing the edited image file (100a) will not have the metadata (101) relating to the image that was available in the original file (100).

Figure 2:
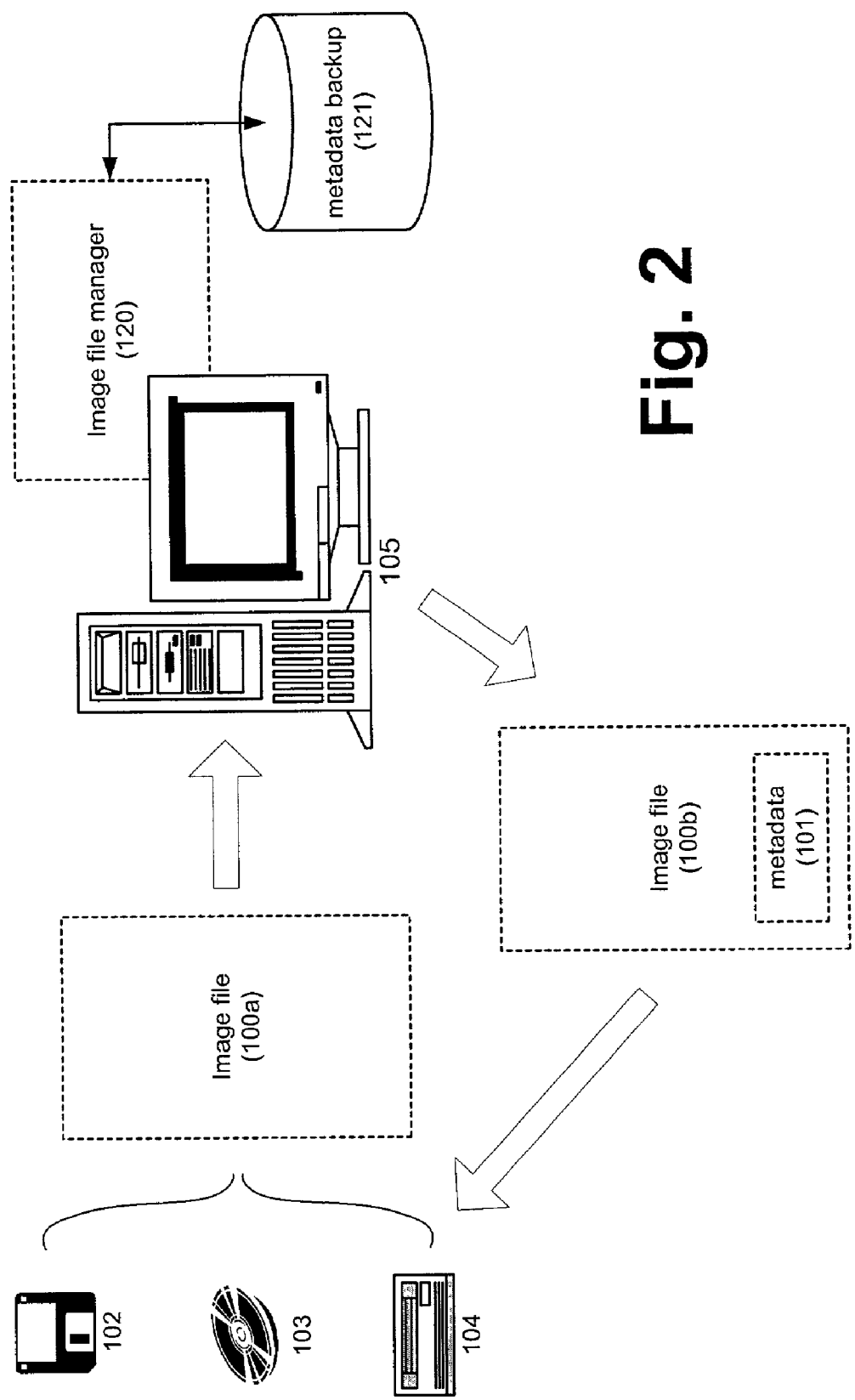
FIG. 2 is an illustration of an embodiment of a computer system used to manage a library of image files with the metadata backup features of the present invention.

FIG. 2 is an illustration of a computer system used to manage a library of image files with the metadata backup features of the present invention. As shown in FIG. 2, there is again a library of image files stored on one or more storage media. The present invention places no restrictions on the type of data storage medium used to store the image files. As indicated, common examples of such storage media include the floppy disk (102), optical disk (103) and hard drive (104) illustrated in FIG. 2.

According to the present invention, the image file library is managed by an image file manager (120). Image file manager (120) is preferably a software package or application that can be run on a computer system (105) to catalog and manage a library of image files stored on storage media (e.g., 102, 103, 104) accessible to the computer (105). As will be described in more detail below, image file manager (120) creates and maintains a backup database (121) that includes a copy of the metadata from each image file in the library under management of image file manager (120).

Extending the example of FIG. 1, image file (100a) was edited. The metadata in the file (100a) was removed and discarded by the image editor. Edited image (100a) was then saved to the library of image files under the same name and consequently there is no access to the original, unedited file and the metadata it included.

Image file manager (120) can then retrieve the edited image file (100a) from storage. As will be described below, image file manager (120) may retrieve the image file (100a) automatically for a periodic check or may not access the image file (100a) until directed to do so by a user or upon access by the user of a related edited file.

Image file manager (120) will search the image file (100a) for metadata. In the current example, no metadata are contained in the edited image file (100a). When the image file manager (120) fails to find any metadata in the file (100a), the image manger (120) will access the metadata backup database (121) and retrieve from the database (121) the metadata formerly stored in the image file (100a) before the file was edited.

A copy of the retrieved metadata (101) is again written into the image file (100*b*) by the image file manager (120). The image file (100*b*) including the metadata (101) is then saved back to the image library on the storage medium or media (e.g., 102, 103 or 104). Thus, if the image file (100*b*) is copied or accessed from the library, or the storage medium containing the image file (100*b*) is moved to another computer, the metadata (101) will be included.

As will be appreciated by those skilled in the art, the image file manager (120) may be a stand-alone program with its own user interface. It may perform monitoring and restoration of image file metadata automatically or only when controlled by a user. The image file manager (120) may also run under, or as a part of, another piece of software so that the metadata restoration function of the image file manager (120) is performed when those other applications access image files in the library.

Figure 3:
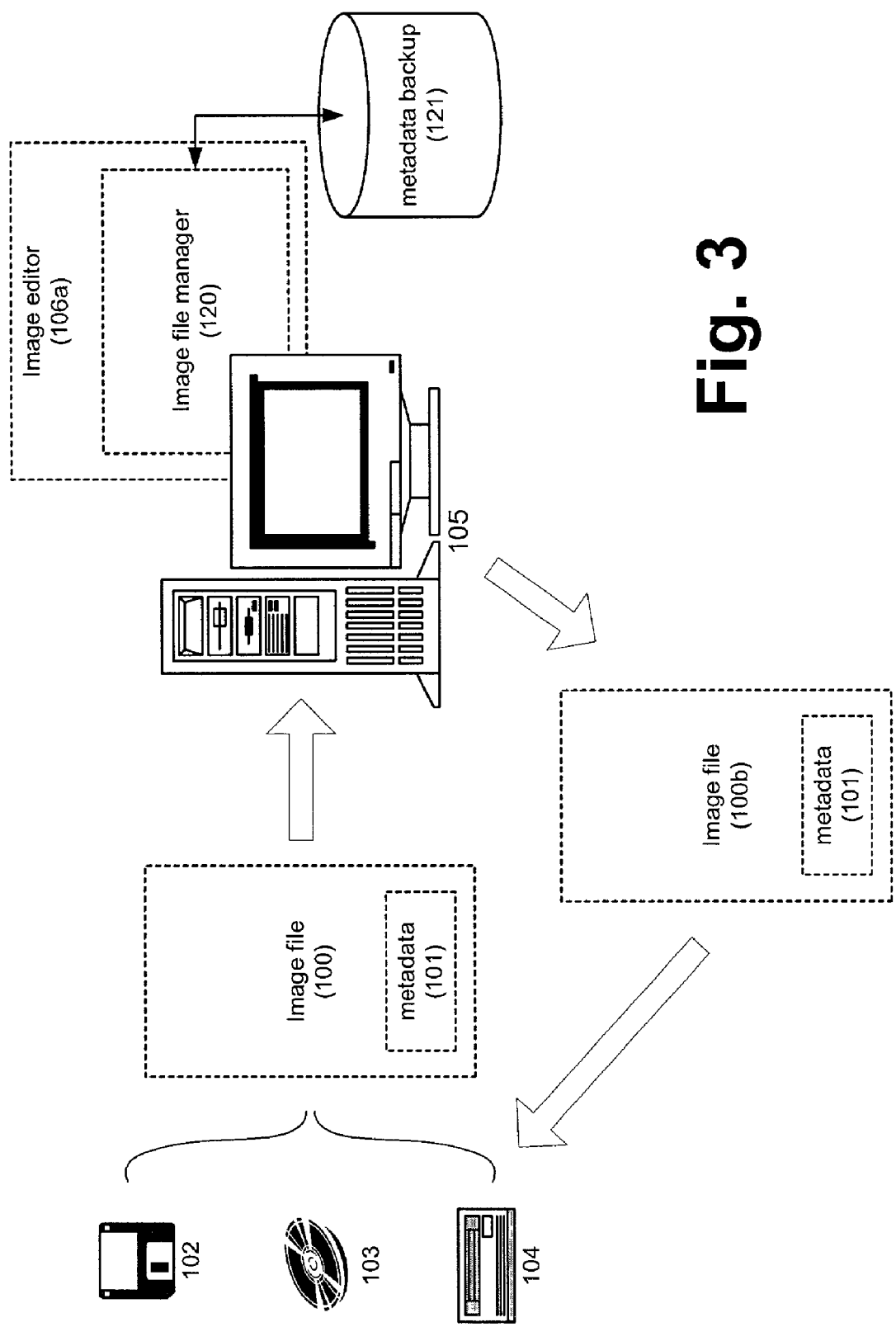
FIG. 3 is an illustration of another embodiment of a computer system managing a library of image files according to the present invention.

FIG. 3 is an illustration of another embodiment of a system managing a library of image files according to the present invention. As shown in FIG. 3, the image file manager (120) can be a part of an image editor (106*a*). Thus, when the image editor (106*a*) retrieves an image file (100) for editing, the image file manager (120) will backup any metadata (101) in the file (100) to the backup database (121).

Then, when the editing is completed or the image file is being saved, the image file manager (120) can retrieve and rewrite to the image file (100*b*) any metadata (101) lost during editing. In this way, the image file manager (120) can function as an integral part of the image editor (106*a*) or as a secondary application that can be called and used by the image editor (106*a*).

Figure 3A:
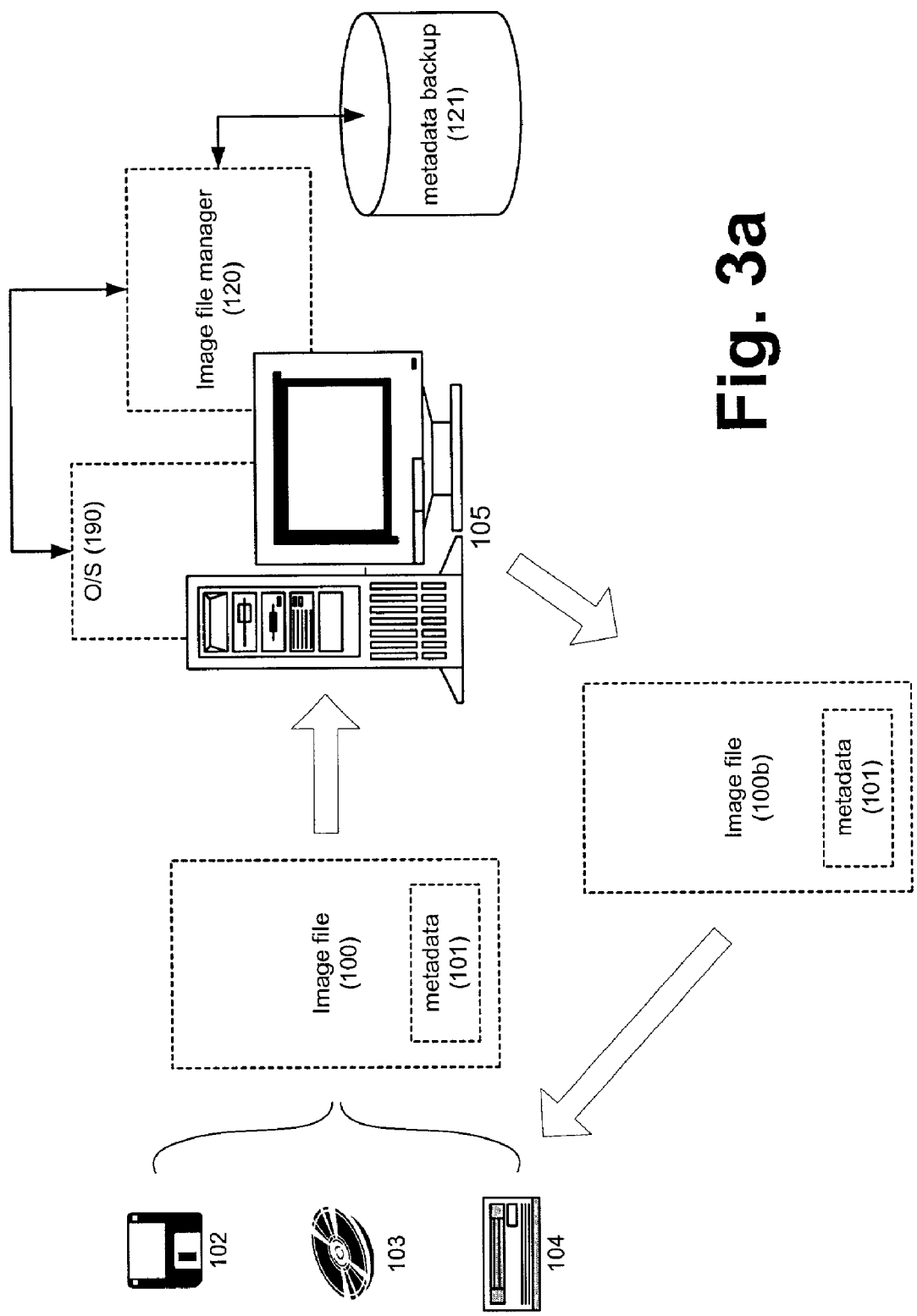
FIG. 3a is an illustration of still another embodiment of a computer system managing a library of image files according to the present invention.

FIG. 3*a* is an illustration of a further embodiment of a system managing a library of image files according to the present invention. As shown in FIG. 3*a*, the image file manager (120) can be called by the operating system (O/S) (190) running on the computer (105). When any application running on the computer (105) saves or updates an image file (100), the operating system (190) monitors the access to the image file (100).

Consequently, the operating system (190) can initiate the image file manager (120) to check the newly-saved or re-saved image file (100) for metadata. If the metadata (101) is missing, the image file manager (120), as described above, can retrieve and rewrite to the image file (100*b*) any metadata (101) lost that is stored in the backup database (121).

Figure 4:
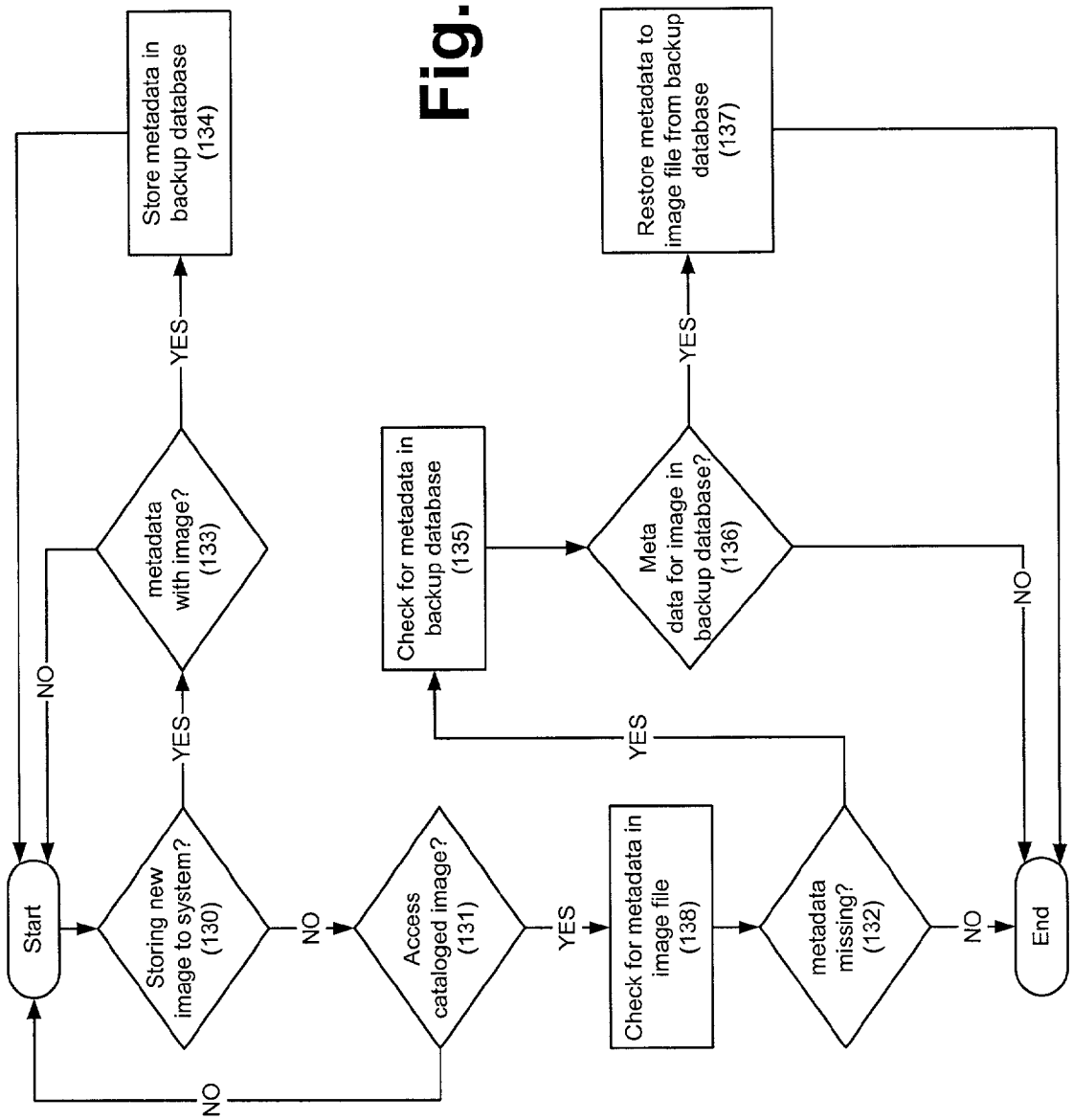
FIG. 4 is a flowchart illustrating a preferred method of preserving image file metadata according to the present invention.

FIG. 4 is a flowchart illustrating a preferred method of preserving image file metadata according to the present invention. As shown in FIG. 4, the method may begin when a new image file is saved to the image library under management (130). It is first determined whether there is any metadata included with the image (133). If not, the image is simply added to the library. If metadata are included (134), that metadata are stored to the backup metadata database (134). An identification of the file or image with which the metadata are associated is also recorded.

If new images are not being added to the library under management, the method waits for the user to access a cataloged image file (131). The user may access the file with an image editor or other application that calls the image file manager or may access the file directly with the image file manager.

When the file is accessed, the image file manager checks the file for metadata (138). As described above in connection with FIG. 3*a*, file access can be determined by the operating system, which then preferably initiates the file manager's check for metadata. If the metadata are found in the file, the image file manager need do nothing further; the image file is accessed and used as desired. However, if there is no metadata or the metadata are missing (132), the image file manager will check the metadata backup database for a copy of the metadata that should be associated with the accessed image file (135).

There may or may not be a backup copy of the file's metadata in the backup database (136). If there is no duplicate copy of the metadata, the image file can still be used without the metadata. However, any application features that use or depend on metadata will not be available.

If the metadata for the file is backed up in the database, the metadata can be restored to the image file (137). The image file manager writes the metadata from the backup database to the image file. The user can then use the image file and any application features dependent on the restored metadata within the file will be available.

FIG. 5 is a flowchart illustrating another preferred method of preserving image file metadata according to the present invention. In FIG. 4, the image file manager checked for missing metadata and restored lost metadata when the image file was accessed by another application or specifically with the image file manager directly. In the method of FIG. 5, the image file manager will automatically access each image file periodically to verify the existence of appropriate metadata and restore lost metadata where possible.

As shown in FIG. 5, as the image file manager runs, a periodic cycle occurs (140). At a designated point in the cycle, the image file manager will access a cataloged image file from the library under management (141).

The image file manager will then check the accessed file for metadata (138). If the metadata has been removed (132), the image file manager will check the backup database for the metadata belonging to the accessed file (135). If backup metadata are identified (136), it is restored to the image file (137).

If the metadata are not missing, or no backup metadata are available to replace lost metadata, the image file manager will move on to the next image file (142) and repeat the process. Similarly, if the accessed file includes metadata (132), the image file manager can move on the next image file. This process cycles until all the files in the library under management of the image file manager have been checked for metadata (142) and metadata has been restored where available and needed.

When all the files have been checked, the image file manager takes no further action until the next periodic metadata check (140). In this way, the image file manager, running transparently or, alternatively, subject to user prompts, periodically ensures that, to the extent possible, the image files in the library under management include appropriate metadata.

FIG. 6 is a flowchart illustrating a further preferred method of preserving image file metadata according to the present invention. FIG. 6 addresses the scenario in which the metadata for an image file is updated or edited.

The method begins when the image file is accessed (151). This may be a user-initiated accessing of the file for editing, copying, viewing or some other purpose. Alternatively, the file may be automatically accessed by the image file manager pursuant to an automatic periodic check of the metadata in the image files under management as described above in connection with FIG. 5.

When the file is accessed (151), the image file manager checks for the presence of metadata in the file (152). If there is no metadata, the image file manager will seek to find a duplicate copy of the metadata for the file (136) and restore that metadata to the file as described above (137).

If metadata are found in the accessed file, the image file manager will compare that metadata with any metadata stored in the backup database for the accessed file (153). For example, the image file manager may check to see whether the metadata in the accessed file is newer, i.e., has been updated, since the metadata in the file was backed up to the metadata backup database. The file manager may alternatively check to see whether the metadata in the accessed file is more complete than the metadata in the backup database.

If the metadata in the accessed file is newer, more complete or otherwise superior to that stored in the backup database, the image file manager will update the backup database with the metadata from the accessed file (154). In this way, changes, updates or additions to the metadata in an image file will be captured by the backup database. Thus, when metadata are restored to an image file after editing from the backup database, the restored metadata will be current and accurate.

What is claimed is:

1. A method of preserving metadata in an electronic image file, said method comprising:
    managing electronic image files stored in a library with an image file manager;
    providing a metadata backup database containing backup copies of metadata copied from a plurality of electronic image files in said library, each backup copy of metadata being stored with an identification of the electronic image file from which that metadata was copied;
    removing said metadata of an electronic image file during use of said electronic image file by an application;
    automatically searching through said library of managed electronic image files on a periodic basis to identify an electronic image file containing no metadata after the use of said electronic image file by said application;
    searching said metadata backup database for metadata associated with said identified electronic image file;
    identifying a backup copy of metadata corresponding to said identified electronic image file after searching said metadata backup database; and
    copying said identified backup copy of metadata into said identified electronic image file after said metadata have been removed from said identified electronic image file.

2. The method of claim 1, further comprising compiling said metadata backup database by reading metadata from one or more image files and recording said metadata in said metadata backup database.

3. The method of claim 1, further comprising updating metadata in said metadata backup database when updated metadata are retrieved from an electronic image file.

4. An image file management application comprising computer-readable instructions stored on a computer-readable medium, said instructions causing a computer or processor to:
    manage electronic image files stored in a library with an image file manager;
    provide a metadata backup database containing backup copies of metadata copied from a plurality of electronic image files in said library, each backup copy of metadata being stored with an identification of the electronic image file from which that metadata was copied;
    remove said metadata of an electronic image file during use of said electronic image file by an application;
    automatically search through said library of managed electronic image files on a periodic basis to identify an electronic image file containing no metadata after the use of said electronic image file by said application;
    search said metadata backup database for metadata associated with said identified electronic image file;
    identify a backup copy of metadata corresponding to said identified electronic image file after searching said metadata backup database; and
    copy said identified backup copy of metadata into said identified electronic image file after said metadata have been removed from said identified electronic image file.

5. The application of claim 4, wherein said instructions further cause a computer or processor to compile said metadata backup database by reading metadata from one or more image files and recording said metadata in said metadata backup database.

6. The application of claim 4, wherein said instructions further cause a computer or processor to update metadata in said metadata backup database when updated metadata are retrieved from an electronic image file.

7. The application of claim 4, wherein said image file management application is integrated into an image editor application.

8. The application of claim 4, wherein said image file management application is called by an image editor application.

9. A system for preserving metadata in an electronic image file, said system comprising:
    a computer running an image file management application;
    a library of electronic image files;
    an operating system running on said computer;
    a backup database with copies of metadata copied from a plurality of electronic image files in said library, each copy of metadata being stored with an identification of the electronic image file from which that metadata was taken;
    wherein an image editor application removes metadata of an electronic image file during editing of said electronic image file;
    wherein said operating system detects when any of said electronic image files are saved, and calls said image file management application to check said saved electronic image files for metadata;
    wherein said image file management application is functional to:
    periodically check said electronic image files automatically to identify an electronic file that has no metadata that has been removed during the editing of said electronic image;
    search said metadata backup database for metadata associated with said identified electronic image file;
    identify a backup copy of metadata corresponding to said identified electronic image file after searching said metadata backup database; and
    restore said identified backup copy of metadata into said identified electronic image file after said metadata have been removed from said identified electronic image file.

10. The system of claim 9, wherein said image editor application calls said image file management application to access said electronic image files.

11. The system of claim 9, wherein said image file management application compiles said backup database by copying metadata from said electronic image files to said backup database.

12. The system of claim 9, wherein said image file management application updates metadata in said backup database with updated metadata taken from said electronic image files.

13. The system of claim 9, wherein said image file management application copies metadata from said backup database into a corresponding image file when said file is accessed by a user of said computer.

14. An image file management system for preserving metadata stored in electronic image files, said system comprising:
- means for managing electronic image files stored in a library by an image file manager;
- means for providing a metadata backup database containing copies of metadata copied from a plurality of electronic image files in said library, each copy of metadata being stored with an identification of the electronic image file from which the metadata was copied;
- means for removing said metadata of an electronic image file during use of said electronic image file by an application;
- means for automatically searching through said library of managed electronic image files on a periodic basis to identify an electronic image file containing no metadata after the use of said electronic image file by said application;
- means for searching said metadata backup database for metadata associated with said identified electronic image file;
- means for identifying a backup copy of metadata corresponding to said identified electronic image file after searching said metadata backup database; and
- means for copying said identified backup copy of metadata into said identified electronic image file after said metadata have been removed from said identified electronic image file.

15. A system for preserving metadata in an electronic image file, said system comprising:
- a computer running an image file management application;
- a library of electronic image files;
- a backup database consisting exclusively of copies of metadata taken from said electronic image files in said library, each copy of metadata being stored with an identification corresponding to said each electronic image file from which said metadata was taken;
- wherein said image file management application including:
- removing said metadata of an electronic image file during use of said electronic image file by an application;
- automatically searching through said library of managed electronic image files on a periodic basis to identify an electronic image file containing no metadata after the use of said electronic image file by an application;
- searching said metadata backup database for metadata associated with said identified electronic image file;
- identifying a backup copy of metadata corresponding to said identified electronic image file after searching said metadata backup database; and
- copying said identified backup copy of metadata into said identified electronic image file corresponding metadata are found in said metadata backup database after said metadata have been removed from said identified electronic image file.

* * * * *